Patented Feb. 5, 1935

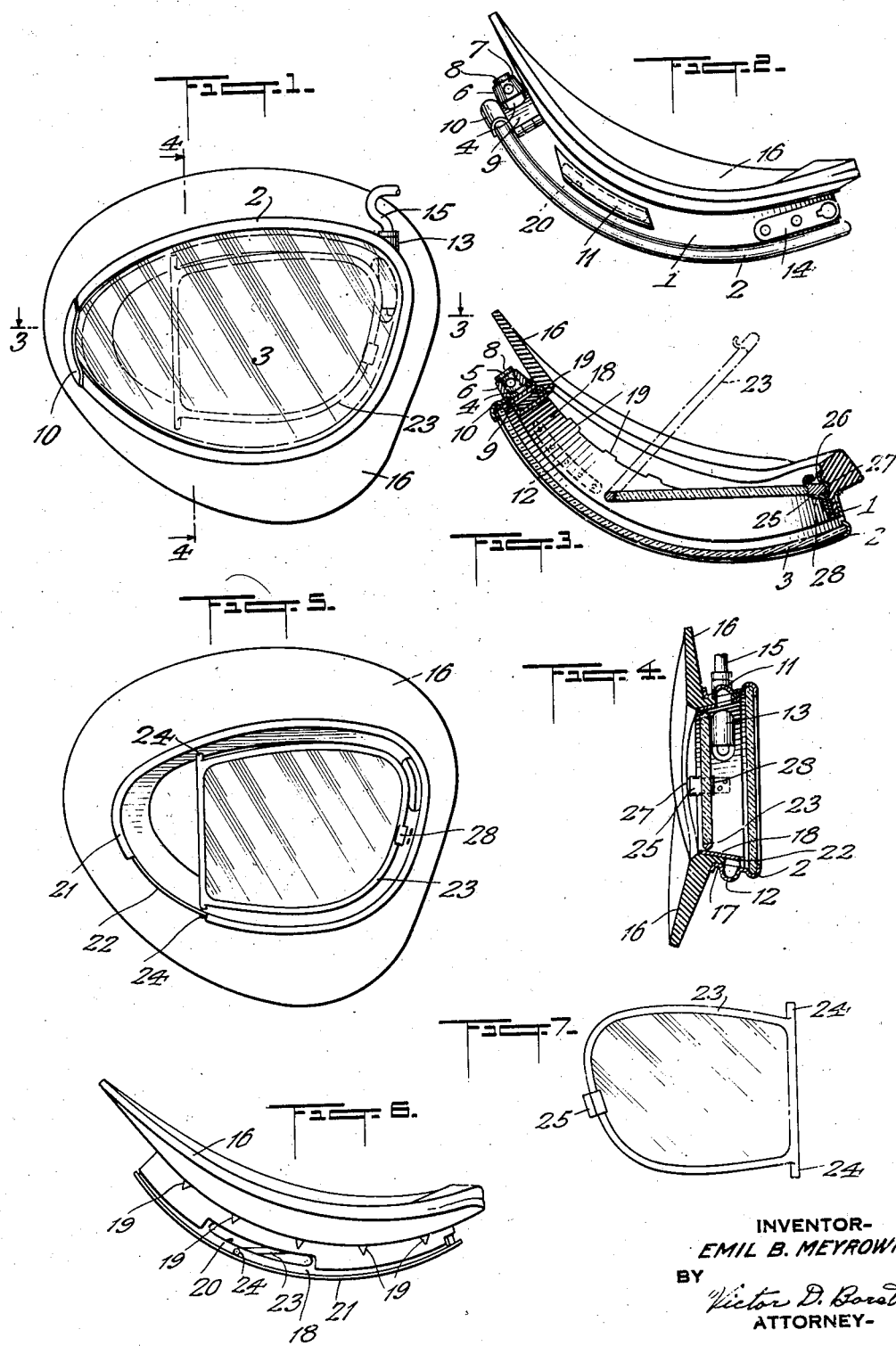

1,989,876

UNITED STATES PATENT OFFICE 1,989,876

GOGGLE

Emil B. Meyrowitz, New York, N. Y., assignor to E. B. Meyrowitz, Inc., a corporation of New York Application March 23, 1933, Serial No. 662,268

7 Claims. (Cl. 2—14)

Protective goggles are constructed to fit snugly the face of the wearer about the eyes and each eye cup of a goggle commonly extends from the nose well back of the eye. In order to protect the face of a person wearing the goggles and to insure against seepage of foreign matter and air into the eye cup between the edge of the eye cup and the face of the wearer, cushions, commonly of soft rubber, are employed, which contact snugly with the face of the wearer. The goggle lens, closing the outer side of the eye cup, is merely a protective lens for shielding or protecting the eye of the wearer from injurious elements such as, for example, excessive air pressure, high wind, etc., encountered by aviators and motorists. Where, because of defects in vision, a person requires a prescription lens, he must either dispense with the correction lens when wearing goggles or have the prescription lens built into the goggles, and it is to the latter type of goggle that my invention relates.

Goggles of the type referred to are frequently subjected, during use, to conditions which necessitate a frequent cleaning of the lens. One such condition which necessitates a frequent cleaning of the lens is that of fogging, and to minimize this fogging, the eye cups of goggles are frequently constructed with ventilating openings so that air passes into the eye cup and over the inner surface of the goggle lens. In goggles having built-in prescription lenses, the prescription lenses are also subjected to the conditions which cause fogging and frequently require cleaning.

It is a purpose of my invention to provide an eye cup for a goggle which has a built-in prescription lens frame that is movable within the eye cup to afford access to both sides of the prescription lens and the inner side of the goggle lens for cleaning the lenses. The prescription lens frame is mounted in the eye cup, and in a construction embodying my invention, it is firmly held in the proper position with respect to the eye of the person wearing the goggle for correcting the vision of the wearer. The lens frame is so mounted within the eye cup that, without disassembling the eye cup, it may be readily, easily and quickly shifted with respect to the eye cup to afford access to both sides of the lens.

In accordance with my invention, I provide within an eye cup for a goggle, a lens frame which is adapted to receive a prescription lens. The lens frame is mounted behind the protective lens of the goggle and is firmly but releasably held in such position relative to the eye cup that the prescription lens is properly positioned with respect to the eye of one wearing the goggles. The lens frame is movably mounted in the goggle eye cup, and it may be released and shifted relative to the eye cup to such a position that both sides of a lens within the frame and the inner side of the goggle lens are accessible for cleaning.

A feature of my invention is the fact that the prescription lens frame, when in correcting position within the eye cup, is so related to the ventilating openings thereof that air entering and passing through the eye cup passes on both sides of the lens frame, thereby avoiding to a considerable extent the conditions causing a condensation of vapor on the lens.

Specifically, I provide an eye cup which is transversely split at one end to expand and contract in the plane thereof. Into this eye cup, there extends a forwardly projecting lip of a soft rubber cushion. The lip of the cushion is secured to an internal, circumferential reinforcing band that contacts with the inner surface of the lip. The eye cup, the lip of the cushion, and the reinforcing band have an outward flare and when closed, the eye cup fits about the reinforcing band and the lip of the cushion and the cushion and eye cup become interlocked. Within the reinforcing band there is rotatably mounted a prescription lens frame. One end of the prescription lens frame, the temple end, is provided with a pair of oppositely extending trunnions. These trunnions extend through the upper and lower sides of the reinforcing band so that the lens frame is rotatably secured to the reinforcing band. At the nasal end of the lens frame, there is mounted a curved, solid projection which forms one member of a latch. The other member of the latch is a spring member secured to the reinforcing band at the nasal end. A stop member determines the position of the lens frame in a latched position, the stop member limiting movement of the lens frame towards the protective lens of the goggle. With this construction, the nasal end of the prescription lens frame may be released and the lens frame swung about its trunnions to a position substantially at right angles to the plane of the eye cup, in which position both sides of a lens within the lens frame are accessible for cleaning or wiping.

The eye cup is somewhat curved substantially on an angle of approximately 30°. This curvature corresponds to the curvature of the portion of the face about which the goggle fits. In the latched position of the prescription lens frame, the lens frame is parallel to the plane of the eye and consequently at an angle of substantially 30° with the plane of the eye cup. In this position, the lens frame traverses the ventilating opening of the eye cup so that air entering through these ventilating openings passes on both sides of the lens frame, subjecting both sides of the prescription lens to the same conditions, and thus minimizing the fogging of the lens due to vapor condensation.

Other features of my invention will be apparent from the following particular description of one embodiment thereof which is illustrated in the accompanying drawing in which:

Fig. 1 is a side elevation of a goggle eye cup embodying my invention;

Fig. 2 is a plan of the eye cup;

Fig. 3 is a sectional plan taken on the line 3—3 of Fig. 1;

Fig. 4 is a transverse sectional end elevation taken on the line 4—4 of Fig. 1;

Fig. 5 is a side elevation of the goggle cushion;

Fig. 6 is a plan of the same; and

Fig. 7 is a side elevation of a prescription lens frame.

In the drawing, there is illustrated a single goggle member; it is of course understood that two such goggle members, together with a nose bridge connecting them together, make up a complete goggle. The goggle member shown includes an eye cup 1 which is made of sheet metal shaped as shown and having an outward taper or flare. At the outer edge of the eye cup, there is formed in the eye cup a V-shaped bezel 2 and this portion of the eye cup, containing this V-shaped bezel, constitutes the frame for the protective lens 3 closing the outer side of the eye cup. The eye cup is transversely split at the temple end so that it may be expanded and contracted in its own plane for convenience in replacing the parts which cooperate with the eye cup to make up the completed goggle member. At the split in the eye cup, on one side thereof, there is a raised plate 4 substantially rectangular in elevation. Secured in this plate and extending laterally therefrom, there is a pin 5 upon which is mounted a frusto-conical latch member 6 having a pair of parallel plane sides 7. This conical member is secured in place on the pin, on which it is rotatably mounted, by an enlarged head 8 formed on the free end of the pin. The parallel sides of the latch member render the base of the latch member substantially oblong, the minor axis or width of the base being of the same width as the plate on which it is mounted. The length or major axis of the base of the latch member 6 is, however, somewhat greater than the width of the plate. To the eye cup, on the opposite side of the transverse slit, there is pivotally secured a link 9 which is provided with a slot of sufficient length and width to receive the raised plate 4. In the closed position of the eye cup, this link extends over the slit in the eye cup and receives the elevated plate in the slot. The latch member is received in, and passes through the slot when the parallel sides thereof are parallel to the longitudinal axes of the slot. When the link is fitted over the plate and the latch member is turned through an angle of 90°, so that the major axis of the base is transverse to the major axis of the plate, the base extends over the edge of the plate and the link, securely locking the link in place and the eye cup in the closed position. The link is also provided with a flange 10 that extends over the bezel so as to close the gap which otherwise might appear in the bezel.

On the upper and lower sides of the eye cup, there are formed circumferential bosses 11 and 12. The boss 11 on the upper side is in the form of a semicylindrical tube which is beveled at both ends, the ends being opened for the passage of air into the tube. On the under side of the eye cup, there are a series of openings formed in the forward side of the boss 12. These openings constitute ventilating openings through which air passes into the eye cup and through the eye cup on the inner side of the protective lens of the goggle. At the nasal end of the eye cup an elongated bushing 13 is provided that extends through the wall of the eye cup and into the eye cup. Formed on this bushing there is a bracket arm 14 that extends circumferentially of the eye cup and is secured thereto. The bracket arm reinforces the bushing and holds it in place. This bushing is provided to receive the leg 15 of a bridge member which connects two such eye cups together to form a pair of goggles.

In conjunction with the eye cup, there is a soft rubber cushion 16 which protects the face of the wearer from the inner edge of the eye cup and at the same time forms a seal between the face of the wearer and the eye cup. This cushion is provided with an inwardly extending lip 17 that extends into the eye cup. The lip of the cushion is secured to a reinforcing band 18 which reinforces the lip. On the inner edge of the reinforcing band, there is a series of pointed projections 19 that extend through the lip of the cushion and are bent over to fasten the lip of the cushion to the band. The reinforcing band is made of sheet metal and is provided with openings to receive the boss 13 and to provide space for the air that enters the eye cup through the ventilating openings. The latter spaces consist of a slot 20 through one side of the reinforcing band and the other consists in cutting away a portion of the flange 21 on the outer edge of the reinforcing band as at 22. The reinforcing band also serves as a deflector, deflecting the air passing through the eye cup towards the lens. The reinforcing band, and the lip of the cushion, have an outward flare so that when the reinforcing band is within the eye cup and the eye cup is closed, the outward flare of the eye cup and the reinforcing band serve to lock the lip of the cushion and the reinforcing band within the eye cup.

Within the eye cup, there is rotatably mounted a lens frame 23 that is adapted to receive a prescription or correction lens for correcting defects in vision. This prescription lens frame is shaped in elevation as shown and extends from the nasal end of the eye cup to a point beyond the transverse center of the eye cup. The temple end of this lens frame is provided with a pair of oppositely extending trunnions 24 which extend through openings provided therefor in the reinforcing band and the trunnions constitute the shafts about which the protective lens frame may oscillate. On the nasal end of the prescription lens frame which, when the frame is in the correcting position in the eye cup, extends adjacent to the nasal end of the reinforcing band, there is provided a curved solid projection 25. This projection is also provided with a V-shaped groove 26 in which the thumb nail of a person may be inserted to move the lens frame about its pivot. The projection 25 cooperates with a leaf spring 27 to latch the lens frame in position within the eye cup. The leaf spring 27 is secured to the side of the reinforcing band. The reinforcing band is slotted at the point where the leaf spring is secured and the tongue 28 formed by slotting the reinforcing band is bent at right angles to the reinforcing band. This laterally extending tongue forms a stop member to position the lens frame within the eye cup and limit the movement of the lens frame about its trunnions in a direction towards the protective lens of the goggle member. The latch and stop member are so positioned that when the goggle member is on the face of a wearer, the prescription lens frame is properly positioned with respect to the eye of the wearer, that is, the prescription lens frame is parallel to the plane of the eye of the wearer.

The eye cup is curved at an angle of about 30° to conform to the curvature of the face of the wearer. The prescription lens frame of course is mounted so as to be parallel to the eye of the wearer, and in its latched position within the eye cup, it is at an angle of substantially 30° to the plane of the eye cup. In this angular position of the prescription lens frame, the lens frame traverses the ventilating openings of the eye cup so that air entering through these ventilating openings and passing through the eye cup will pass on both sides of the prescription lens within the lens frame and thereby minimize fogging of the prescription lens caused by vapor condensation.

It will be observed that the construction illustrated in the drawing, and the detailed description above, that the prescription lens frame may be readily unlatched and swung about its trunnions to a position substantially 90° to the plane of the eye cup. In this position both sides of a lens within the prescription frame are accessible for wiping and cleaning of the lens.

It will be obvious that various changes may be made by those skilled in the art in the details of my invention as illustrated in the drawing and above particularly described within the principle and scope of the invention as expressed in the appended claims.

I claim:

1. In a goggle, in combination an eye cup, a lens therefor closing the forward end thereof, a lens frame within the eye cup and having one end thereof rotatably secured within the eye cup, said lens frame being adapted to receive a prescription lens, and means adjacent the nasal end of the eye cup for latching the free end of the lens frame within the eye cup.

2. In a goggle, in combination an eye cup, a lens therefor closing the forward end thereof, a cushion having a lip extending into the eye cup, a reinforcing band for the lip of the cushion, a lens frame rotatably secured at one end to the reinforcing band, and a latch for latching the free end of the lens frame to the reinforcing band and positioning the lens frame within the eye cup.

3. In a goggle, in combination an eye cup, a lens therefor closing the forward end thereof, a cushion having a lip extending into the eye cup, a reinforcing band for the lip of the cushion, a lens frame within the eye cup, a pair of trunnions extending from one end of the lens frame and into the reinforcing band rotatably securing the lens frame to the reinforcing band, and a latch for latching the free end of the lens frame to the reinforcing band and positioning the lens frame within the eye cup.

4. In a goggle, in combination an eye cup, a lens therefor closing one end thereof, and a lens frame for a prescription lens within the eye cup behind the lens, said lens frame being mounted within the eye cup for movement angularly with respect to the plane of the lens closing the end of the eye cup.

5. In a goggle, in combination an eye cup, and a lens therefor closing one end thereof, a lens frame for a prescription lens pivotally mounted within the eye cup for movement angularly with respect to the plane of the lens closing the end of the eye cup.

6. In a goggle, in combination an eye cup, a lens therefore closing one end thereof, and a lens frame for a prescription lens pivotally mounted about an axis substantially parallel to the plane of the lens closing the end of the eye cup.

7. In a goggle, in combination an eye cup, a lens therefor closing one end thereof, a lens frame for a prescription lens pivotally mounted about an axis substantially parallel to the plane of the lens closing the end of the eye cup, and means for positioning the prescription lens frame within the eye cup.

EMIL B. MEYROWITZ.